Patented May 5, 1953

2,637,727

UNITED STATES PATENT OFFICE 2,637,727

N-(3,4,6-TRIACETYL-D-GLUCOSYL) PIPERIDINE AND METHOD OF PREPARING SAME

John E. Hodge, Peoria, Ill., assignor to the United States of America as represented by the Secretary of Agriculture No Drawing. Application September 12, 1951, Serial No. 246,325

17 Claims. (Cl. 260—211.5)

(Granted under Title 35, U. S. Code (1952), sec. 266)

The invention herein described may be manufactured and used by or for the Government of the United States of America for governmental purposes throughout the world without the payment to me of any royalty thereon.

This invention relates to a triacetyl piperidine-N-glucoside, particularly N-(3,4,6-triacetyl-D-glucosyl)piperidine, a novel chemical compound, and to methods for preparing the same. The novel compound of my invention has the following structural formula:

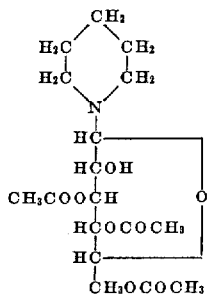

I have discovered that this novel compound may be prepared by the interaction of piperidine with pentaacetyl alpha- or beta-D-glucose. It is produced by my process in the form of fine, colorless needles. The melting point of the pure compound is accompanied with decomposition. It is sharp, but may vary between 121° and 126° C., depending upon the manner and rate of heating. Solutions of the compound in glacial acetic acid, and in aqueous alcohol, undergo decomposition with browning on standing at room temperature.

From the structural formula, it may be seen that the second carbon atom of the glucose group contains a free hydroxyl radical. This unique structural configuration renders the new compound particularly useful as an intermediate in organic syntheses. Novel products, substituted on the second carbon atom, may be prepared using my novel chemical compound as a starting material. Subsequent removal of the remaining acetyl and piperidyl groups is relatively easy. My new compound likewise may be advantageously employed as an intermediate for making and extending the classes of known compounds, such as the 2-alkyl and 2-acyl glucoses.

The novel compound of my invention may be prepared by mixing the two reagents, piperidine and either alpha- or beta-D-glucose pentaacetate. I prefer to employ approximately 2 to 4 molecular equivalents of piperidine for each molecular equivalent of glucose pentaacetate. The reaction may be carried out in an inert organic medium, such as ether, benzene, acetone, ethanol and methanol. I prefer, however, to use no medium, but to carry out the reaction by mixing the two reagents. I have found the use of inert reaction media unnecessary, and in several instances, have found their use to result in a reduced yield.

The reaction is exothermic, and care should be taken to keep the reaction temperature below 50° C. to prevent the excessive formation of brown-colored byproducts. I prefer to employ temperatures below 30° C. and above 0° C. Maintenance of the temperature within this range frequently requires mild cooling during the reaction. Completion of the reaction is evidenced by the presence of crystallizable product. Crystallization frequently occurs spontaneously; while, in other instances, crystallization may be induced and accelerated by the introduction of seed crystals of N-(3,4,6-triacetyl-D-glucosyl)-piperidine. The reaction time is usually within the period of 10 to 30 minutes at 25° C. It may be substantially longer at temperatures near 0° C.

The product may be recovered from the reaction mixture by crystallization. I prefer to employ ethers, such as diethyl ether, hydrocarbon solvents, such as petroleum ether and benzene, ketones or alkanols, such as methanol or ethanol, as addition agents to the reaction mixture to obtain the crude crystals. The product may be obtained in pure form by washing with alcohols or by recrystallization from alcohols.

The following specific examples illustrate the invention.

*Example 1*

Pentaacetyl-beta-D-glucopyranose, 117 g. (0.30 mole) and piperidine, 77 g. (0.90 mole), were stirred together in a flask. When spontaneous warming of the mixture began, the flask was cooled in an ice water bath, and the temperature of the mixture was kept between 20° and 30° C. thereafter. With continuous stirring, the originally pasty mass became fluid and nearly clear within 10 minutes from the time of mixing. A few minutes later crystallization of the product began. Stirring was continued while 100 ml. of diethyl ether was added to increase the yield of crystals. The flask was then kept at 0° C. for one hour. The crystals were collected, filtered, washed with ether, and dried in a desiccator in vacuo over calcium chloride. Yield, 49 g. The filtrate was diluted with ether, kept at 0° C. for 18 hours, and a second batch of crystals was obtained. Yield, 20 g. The total yield of crude, white product was 69 g. (62 percent of theory). It melted with decomposition at 119° C.

The crude product was purified by stirring it in 150 ml. absolute ethanol for 10 mintes, filtering, washing with absolute ethanol and ether, and drying. Yield, 40 g. (36 percent of theory). The product consisted of white, needle-like crystals which melted sharply at 125° C. with decomposition.

In place of the diethyl ether, added to the crude reaction mixture to increase the yield of crystals, I may substitute a hydrocarbon solvent, such as petroleum ether, a ketone, such as acetone, or methyl ethyl ketone, or an alkanol, such as methanol or ethanol.

Example 2

Pentaacetyl - beta - D - glucopyranose, 39.1 g. (0.10 mole), of melting point 131° C., was cooled to 0° C., and piperidine, 28 g. (0.33 mole), of boiling point 106° to 107° C., also cooled to 0° C., was added. The reaction mixture was kept at 0° C. for 9 hours, and then allowed to stand at room temperature for 2 hours. To the solid, partially crystalline reaction mixture was then added 200 ml. of diethyl ether, and the lumps were broken up with a spatula. The mixture was allowed to stand at room temperature for 2 hours, whereafter the crystals were filtered off and washed with absolute ethanol. After drying in vacuo, the yield was 12.8 g. (34 percent of theory). Recrystallization from absolute ethanol yielded 9.0 g. (24 percent of theory) of pure white, fine crystaline needles, melting sharply with decomposition at 123° C. The crystals turned brown a few degrees before the melting point was reached.

Anal: Calc'd. for $C_5H_{10}N \cdot C_6H_8O_5(COCH_3)_3$: C, 54.68; H. 7.29; N, 3.75; Acetyl 34.58%. Found: C, 54.71; H, 7.21; N, 3.94; acetyl 34.74%. Specific rotation: $[\alpha]_D^{25} + 31.6°$ (C 4, in chloroform).

Example 3

Pentaacetyl-alpha-D-glycopyranose, 19.7 g. (0.050 mole), was suspended in 50 ml. dry ether, and piperidine, 17.0 g. (0.20 mole), was added. There was a cooling effect on adding the piperidine, but after 20 minutes at room temperature the solution began to warm, and the pentaacetyl-alpha-D-glucopyranose dissolved completely. No color developed. Light petroleum ether (30 ml.) was added, then the reaction mixture was cooled to 1° C. for 4 hours. The crystalline precipitate was filtered off and dried in vacuo over calcium chloride. A second batch of crystals was obtained by adding petroleum ether to the filtrate and recooling at 1° C. for 18 hours. The crude material was stirred with 80 ml. of absolute ethanol, filtered, and dried. Yield 4.75 g. (25 percent of theory). The white needle-like crystals melted and decomposed at 122°–123° C. Specific rotation: $[\alpha]_D^{25} + 31.7°$ (C 4, in chloroform).

The following specific example consists of four consecutive steps:

(a) Alkylation,
(b) Deacetylation,
(c) Hydrolysis, and
(d) Formation of a phenylhydrazone derivative.

The four steps establish the structure of the compounds of this invention. The first three steps, moreover, illustrate the utility of N-(3,4,6-triacetyl-D-glucosyl) piperidine in the preparation of 2-substitution glucoses.

Example 4

(a) N - (3,4,6 - triacetyl-D-glucosyl) piperidine was methylated by the following procedure. The product of Example 1, 20.2 g. (0.054 mole), was suspended in 71 g. (0.50 mole) of methyl iodide, and the mixture was allowed to stand for 30 minutes. Freshly prepared moist silver oxide, 15 g. (containing 10.5 percent moisture), was then added in portions over 30 minutes with constant shaking. Toward the end of the addition, the viscosity of the slurry decreased noticeably and the mixture became warm. After shaking mechanically for 30 minutes and allowing to stand at room temperature for one hour, the mixture was filtered to remove the silver compounds. The filtrate was concentrated to dryness in vacuo, yielding a crystaline residue. This crude product (19.5 g.), was recrystallized from hot n-butyl ether, yielding 17.5 g. (84 percent of theory) of dense, colorless needles of M. P. 109°–110° C. A second recrystallization gave the pure product which melted without discoloration at 113° C. Specific rotation: $[\alpha]_D^{25} + 22.9°$ (C 3, in chloroform).

Anal: Calc'd. for

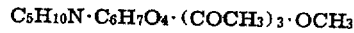

$C_5H_{10}N \cdot C_6H_7O_4 \cdot (COCH_3)_3 \cdot OCH_3$

Methoxyl, 8.01%; acetyl 33.3%. Found: Methoxyl 8.19%; acetyl 33.0%.

The product was N-(2-methyl-3,4,6-triacetyl-D-glycosyl) piperidine, of the following structural formula:

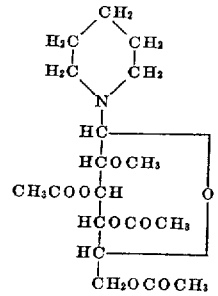

The methyl iodide used as methylating agent in the foregoing procedure may be replaced by other etherifying agents, such as butyl bromide, benzyl bromide, or other aliphatic or aromatic halides commonly used as etherifying agents to obtain the corresponding 2-alkyl, 2-benzyl, and the like derivatives.

(b) N - (2 - methyl-3,4,6-triacetyl-D-glucosyl) piperidine was deacetylated in the following manner. Four grams of the recrystallized derivative, M. P. 113°, was dissolved in 25 ml. absolute methanol, and the solution was added to a saturated, anhydrous solution of ammonia in methanol, 50 ml., prepared at 0° C. The combined solutions were held at 0° C. while dry ammonia gas was bubbled through for 45 minutes. The clear, colorless solution so obtained was concentrated in vacuo to a sirup. The sirup was taken up in diethyl ether, and soon thereafter, crystals of the product formed. They were filtered off and dried. Yield, 1.5 g. (56 percent of theory); M. P. 112° C. Recrystallization from ethyl acetate gave the pure product which melted at 114° C. with slow decomposition of the melt on further heating. Specific rotation: $[\alpha]_D^{25} - 6.0°$ final (C 2, in pyridine).

Anal: Cal'd. for $C_5H_{10}N \cdot C_6H_{10}O_4 \cdot OCH_3$: N, 5.36%; methoxyl, 11.88%. Found: N, 5.35%; methoxyl, 11.96%.

The product was N-(2-methyl-D-glycosyl)piperidine, which has the following structural formula:

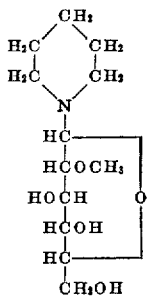

The foregoing deacetylation produre may also be applied to the analogous 2-ethyl, 2-butyl, or 2-benzyl derivatives to obtain the corresponding N-(2-substituted-D-glycosyl)piperidines.

(c) N - (2 - methyl-D-glucosyl)piperidine was hydrolyzed as follows. One gram of the above compound, M. P. 114° C., was dissolved in 25 ml. of 1.0 N sulfuric acid, and the solution was heated in a steam bath for 90 minutes. The acid solution was neutralized with an excess of barium carbonate, then filtered. The neutral filtrate, free of sulfate ion, was cencentrated in vacuo to a sirup. The sirup was dissolved in a little ethanol, then ethyl acetate was added to the point of incipient turbidity. On cooling to 0° C. the product crystallized. Yield 0.45 g. (61 percent of theory); M. P. 154°–156° C. After two recrystallizations from absolute ethanol, 0.2 g. of pure white, dense, prismatic crystals was obtained which melted at 160° C. without discoloration. Specific rotation: $[\alpha]_D^{25}$ after 5 minutes in solution, $+21°$; final constant value after 7 hours, $+66°$ (C 1.5, in water).

Anal: Calc'd. for $C_6H_{11}O_5 \cdot OCH_3$: C, 43.29%; H, 7.27%; Methoxyl 16.0%. Found: C, 43.3%; H, 7.26%; methoxyl, 16.2%.

The melting point, specific optical rotation, and analysis indicated the final product to be 2-methyl-beta-D-glucose. It has the following structural formula:

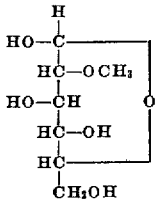

(d) The indentity of the 2-methyl-beta-D-glucose was confirmed by preparing the known phenylhydrazone derivative. The crystalline 2-methyl glucose, 0.2 g., was dissolved in methanol and 3 drops of phenylhydrazine was added. After evaporation on the steam bath, a crystalline residue remained. Recrystallization from ethanol yielded brilliant platelets of M. P. 176°–177° C. Specific rotation: $[\alpha]_D^{25}$ 8 to 30 minutes after dissolving, $-9.8°$ (C 1, in pyridine).

Anal: Calc'd. for $C_6H_{11}O_4 \cdot OCH_3 \cdot N_2HC_6H_5$: N, 9.86%; methoxyl, 10.90%. Found: N, 9.64%; methoxyl, 10.97%.

The melting point, optical rotation, and analysis show that the compound is 2-methyl-D-glucose phenyl hydrazone.

This example establishes the position of the unsubstituted hydroxyl group in N-(3,4,6-triacetyl-D-glucosyl)piperidine on the second carbon atom of the glucose residue.

In the following example, the compound of this invention is employed as an intermediate for the preparation of 2-acyl derivatives, i. e., glucose esterified on a second carbon atom only. As will be seen, the procedure involves a plurality of steps similar to the first three steps of Example 4. They are, namely, (a) esterification, (b) deacetylation, and (c) hydrolysis. The procedure illustrates the utility of N-(3,4,6-triacetyl-D-glucosyl) piperidine in the preparation of 2-acyl glucoses wherein the compound is first esterified at the second carbon atom, and the remaining substituent groups are subsequently removed. The acylating agents employed are those which would not be split off during the conditions of deacetylation and hydrolysis. Examples of such agents are phenyl isocyanate, para-toluenesulfonyl halides and the like.

(a) N - (3,4,6-triacetyl-D-glucosyl)piperidine, 11.2 g. (0.030 mole), was suspended and nearly completely dissolved in 70 ml. dry pyridine in a stoppered flask. To this mixture was added 4.6 g. (0.039 mole) of phenyl isocyanate. The mixture became slightly warm and the remaining crystals dissolved within 15 minutes. After standing at room temperature for 16 hours, the flask was heated on a steam bath for 15 minutes. The color of the solution turned from pale yellow to red-orange during the heating period. After cooling to about 40° C., 50 ml. methanol was added. The solution was then poured into 150 ml. of 50 percent aqueous methanol. The crystalline product which soon formed was filtered off, washed with methanol and ether, and dried. Additional crops of crystals were isolated by concentrating the mother liquor and washings. The combined yield of crude product was 12.2 g. (83 percent of theory); M. P. 163° C. Recrystallized from methanol, the pure white product melted and decomposed at 164° C. Specific rotation: $[\alpha]_D^{25}$ $+36.6°$ (C 2, in chloroform).

Anal: Calc'd. for: $C_{24}H_{32}O_9N_2$: C, 58.52%; H, 6.55%; N, 5.69%; acetyl, 26.22%. Found: C, 58.8%; H, 6.2%; N, 5.72%; acetyl, 26.2%.

The compound was N-(2-carbanilino-3,4,6-triacetyl-D-glucosyl) piperidine.

(b) Crude crystalline N-(2-carbanilino-3,4,6-triacetyl-D-glucosyl)piperidine, 17.5 g., was deacetylated in 350 ml. of methanol saturated with anhydrous ammonia at $-5°$ C. The mixture was kept at 0° C. for 23 hrs. Concentration of the solution in vacuo produced a dry mass of white crystals. The residue was stirred with 100 ml. ethyl acetate, and the crystals remaining were filtered off, washed with ethyl acetate, and dried. Yield, 11.8 g. (91 percent of theory). The product was recrystallized from methanol, yielding clumps of fine, white crystals, M. P. 152° C. with decomposition. Specific optical rotation: $[\alpha]_D^{25}$ $+63.5°$ (C 0.9, in pyridine).

(c) The deacetylated product obtained in (b), N - (2-carbanilino-D-glucosyl)piperidine, 2.5 g., was shaken with 100 ml. of 0.10 N hydrochloric acid, and the mixture was allowed to stand at room temperature for 4 days. The solution was neutralized with 0.6 g. silver carbonate, and the silver residues were filtered off. The filtrate was concentrated in vacuo to a sirup. The residual sirup was taken up in hot ethanol-ethyl acetate. On cooling, 0.6 g. of crystals were obtained. Recrystallization from absolute ethanol produced the pure product, 0.45 g., of M. P. 165°–166° C. Specific rotation: $[\alpha]_D^{25}$ initial, $+43.0°$; final, constant after 7 hrs. +45.5° (C 1.0, in water). The product is 2-carbanilino-D-glucose.

Anal: Calc'd. for $C_{13}H_{17}O_7N$: C, 52.17%; H, 5.73%; N, 4.68%. Found: C, 52.3%; H, 5.73%; N, 4.67%.

I claim:

1. N-(3,4,6-triacetyl-D-glucosyl) piperidine of the following structural formula:

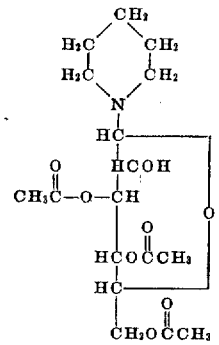

2. The method comprising mixing one molecular equivalent of pentaacetyl glucose with 2 to 4 molecular equivalents of piperidine at a temperature of 0° to 30° C., maintaining the mixture at least until N-(3,4,6-triacetyl-D-glucosyl) piperidine is formed in the reaction mixture.

3. The method of claim 2 in which one of the group consisting of ethers, hydrocarbons, alkanols, and ketones is added to the reaction mixture to cause crystallization of the product.

4. The method comprising mixing N-(3,4,6-triacetyl-D-glucosyl) piperidine with an etherifying agent of the group consisting of aliphatic halides and aromatic halides, recovering the corresponding 2-ether substituted N-(3,4,6-triacetyl-D-glucosyl) piperidine from the reaction mixture, deacetylating the product and hydrolyzing the resulting N-(2-ether substituted-D-glucosyl) piperidine, thereby to produce 2-ether substituted-D-glucose.

5. Method of claim 4 in which the etherifying agent is methyl iodide.

6. Method which comprises mixing N-(3,4,6-triacetyl-D-glucosyl) piperidine with an esterifying agent, subsequently deacetlylating the thus formed 2-acyl product and hydrolyzing the deacetylated product thereby to produce 2-acyl glucose, said esterifying agent being such that the 2-acyl linkage is stable to the subsequent deacetylation and hydrolysis steps.

7. Method of claim 6 in which the esterifying agent is phenyl isocyanate.

8. N-(2-carbanilino-3,4,6-triacetyl-D-glucosyl) piperidine.

9. N-(2-carbanilino-D-glucosyl) piperidine.

10. 2-carbanilino-D-glucose.

11. N-(2-alkyl-D-glucosyl) piperidine.

12. N-(2-methyl-D-glucosyl) piperidine.

13. The method comprising mixing one molecular equivalent of pentaacetyl glucose with 2 to 4 molecular equivalents of piperidine at a temperature of 0° to 30° C., maintaining the mixture at least until N-(3,4,6-triacetyl-D-glucosyl) piperidine is formed in the reaction mixture, mixing the thus formed N-(3,4,6-triacetyl-D-glucosyl) piperidine with an agent of the group consisting of esterifying agents and aliphatic and aromatic halides, recovering the corresponding 2-acyl substituted N-(3,4,6-triacetyl-D-glucosyl) and 2-ether substituted N-(3,4,6-triacetyl-D-glucosyl) piperidine, respectively, from the reaction mixture, deacetylating the product and hydrolyzing the resulting N-(2-substituted-D-glucosyl) piperidine, thereby to produce one of the group consisting of 2-acyl-D-glucose and 2-ether substituted-D-glucose, respectively.

14. The method which comprises mixing N-(3,4,6-triacetyl-D-glucosyl) piperidine with an etherifying agent of the group consisting of aliphatic and aromatic halides, and recovering the corresponding 2-ether substituted N-(3,4,6-triacetyl-D-glucosyl) piperidine.

15. The method which comprises mixing N-(3,4,6-triacetyl-D-glucosyl) piperidine with an esterifying agent and subsequently deacetylating the thus formed 2-acyl product.

16. The method which comprises esterifying N-(3,4,6-triacetyl-D-glucosyl) piperidine by mixing with it an esterifying agent and recovering the thus formed N-(2-acyl-3,4,6-triacetyl-D-glucosyl) piperidine from the reaction mixture.

17. The method which comprises mixing N-(3,4,6-triacetyl-D-glucosyl) piperidine with an etherifying agent of the group consisting of aliphatic and aromatic halides, deacetylating the product and recovering the resulting N-(2-ether substituted-D-glucosyl) piperidine.

JOHN E. HODGE.

References Cited in the file of this patent

UNITED STATES PATENTS

| Number | Name | Date |
|---|---|---|
| 2,558,480 | Dittmer et al. | June 26, 1951 |

OTHER REFERENCES

Votocek et al., Collection Trav. Chim Tshecoslovaquie, vol. 9, (1937), pages 117–119.

Certificate of Correction

Patent No. 2,637,727            May 5, 1953

JOHN E. HODGE

It is hereby certified that error appears in the printed specification of the above numbered patent requiring correction as follows:

Column 1, lines 23 and 24, for column 3, line 3, for the indistinct printed matter, read *at 119° C.*; column 4, line 18, for "n-butyl" read *n-butyl*; column 5, line 18, for "produre" read *procedure*; line 43, for "16.2%" read *16.3%*; column 8, line 38, for "3,4.6" read *3,4,6*;

and that the said Letters Patent should be read as corrected above, so that the same may conform to the record of the case in the Patent Office.

Signed and sealed this 8th day of September, A. D. 1953.

[SEAL]

ARTHUR W. CROCKER,
*Assistant Commissioner of Patents.*

Certificate of Correction

Patent No. 2,637,727                                May 5, 1953

JOHN E. HODGE

It is hereby certified that error appears in the printed specification of the above numbered patent requiring correction as follows:

Column 1, lines 23 and 24, for $\overset{|}{C}H_3OCOCH_3$      read      $\overset{|}{C}H_2OCOCH_3$ column 3, line 3, for the indistinct printed matter, read *at 119° C.*; column 4, line 18, for "n-butyl" read *n-butyl*; column 5, line 18, for "produre" read *procedure*; line 43, for "16.2%" read *16.3%*; column 8, line 38, for "3,4.6" read *3,4,6*;

and that the said Letters Patent should be read as corrected above, so that the same may conform to the record of the case in the Patent Office.

Signed and sealed this 8th day of September, A. D. 1953.

[SEAL]

ARTHUR W. CROCKER,
*Assistant Commissioner of Patents.*